United States Patent [19]

Brase

[11] Patent Number: 4,898,677

[45] Date of Patent: Feb. 6, 1990

[54] PROCESS FOR INHIBITING SCALE FORMATION AND MODIFYING THE CRYSTAL STRUCTURE OF BARIUM SULFATE AND OTHER INORGANIC SALTS

[75] Inventor: Ingrid E. Brase, E. Windsor, N.J.

[73] Assignee: National Starch and Chemical Corporation, Bridgewater, N.J.

[21] Appl. No.: 929,127

[22] Filed: Nov. 10, 1986

[51] Int. Cl.$^4$ .................................................. C02F 5/10
[52] U.S. Cl. ................................. 210/701; 166/244.1; 252/8.555; 252/180
[58] Field of Search ............................... 210/698–701; 166/244.1; 252/8.552, 180, 181, 8.555

[56] References Cited

U.S. PATENT DOCUMENTS

| | | | |
|---|---|---|---|
| 3,682,224 | 8/1972 | Bleyle | 252/180 |
| 3,806,451 | 4/1974 | Tate | 252/180 |
| 3,879,288 | 4/1975 | Siegele | 210/701 |
| 3,880,765 | 4/1975 | Watson | 210/701 |
| 3,962,110 | 6/1976 | Tate | 210/698 |
| 4,008,164 | 2/1977 | Watson et al. | 252/8.55 B |
| 4,331,792 | 5/1982 | Goretta et al. | 210/701 |
| 4,361,492 | 11/1982 | Dubin | 210/701 |
| 4,530,766 | 7/1985 | Hann et al. | 210/701 |
| 4,532,048 | 7/1985 | Amjad et al. | 210/701 |
| 4,581,145 | 4/1986 | Cuisia et al. | 252/180 |
| 4,590,996 | 5/1986 | Hoskin et al. | 166/244.1 |
| 4,618,448 | 10/1986 | Cha et al. | 210/698 |
| 4,710,303 | 12/1987 | Emmons | 210/698 |

FOREIGN PATENT DOCUMENTS 1148438 6/1983 Canada .
2110659 10/1982 United Kingdom .

OTHER PUBLICATIONS

Sara Sarig—"Crystal Habit Modification by Water Soluble Polymers"—Journal of Crystal Growth, 24/25, (1974), pp. 338–341.

I. Woerner & R. Holzer, "Evaluation of Sulfanated Polymers as Scale Control Additives", 42nd Annual Mtg.-Intl. Water Conf., Oct. 1981.

Primary Examiner—Peter Hruskoci
Attorney, Agent, or Firm—Royal N. Ronning, Jr.; Edwin M. Szala

[57] ABSTRACT

The deposition of scale-imparting precipitates in aqueous media containing significant amounts of barium sulfate and other scale forming salts (e.g., calcium carbonate and calcium sulfate) is inhibited and controlled by adding a scale-inhibiting amount of a water-soluble acrylic acid copolymer with up to about 30% by weight of a vinyl sulfonate, with the copolymer having a weight average molecular weight of below about 90,000.

4 Claims, 3 Drawing Sheets

PROCESS FOR INHIBITING SCALE FORMATION AND MODIFYING THE CRYSTAL STRUCTURE OF BARIUM SULFATE AND OTHER INORGANIC SALTS

BACKGROUND OF THE INVENTION

This invention relates to a process for inhibiting scale formation in all types of dynamic water systems containing significant amounts of barium sulfate as well as other scale-forming salts commonly associated therewith, especially in downhole water systems. It also relates to a process for modifying the crystal structure of barium sulfate and to the crystals thus modified.

The inorganic salts deposited from dynamic water systems are commonly referred to as scale. The build-up of inorganic mineral scale deposits causes many problems such as loss of efficiency and accelerated corrosion in boilers and cooling towers and, in addition, in the latter acts as a site for the accumulation of organic foulants. In producing gas, oil, and geothermal wells, scale deposits in the flow lines and auxiliary equipment such as pumps, heat exchangers, and cooling towers can lead to expensive pipe replacement and downtime.

The types of scale encounters are to some degree similar whether in a boiler, cooling tower, or downhole system. They typically include calcium carbonate, calcium sulfate, calcium phosphate, iron oxide and, in some cases, barium sulfate and other heavy metal sulfate deposits.

Scale formation in downhole systems can result from the co-mingling of two fluid streams, each of which contains a concentration of a particular ion such that, when they commingle, an unstable water is produced. For example, in sulfate scale formation, one stream contains sulfate ions, and the other barium or calcium ions in concentrations such that an unstable water is produced. The mixing of these streams at the well bore results in the precipitation of hard crystalline barium sulfate and calcium sulfate deposits, which gradually build up on the walls of the well tubing to a point where they can choke off fluid flow in the tube if remedial measures are not undertaken. Another cause of scale formation in downhole systems is the precipitation of scale materials from supersaturated solutions containing the salts. When such solutions pass from the formation strata (where the temperatures and pressures are relatively high) into relatively low temperature and pressure areas, at or about the well base, precipitation of the salt on the tubing and surrounding strata occurs.

Barium sulfate scale is also a problem in papermaking. Although barium is present in low concentration, from sources such as wood, water, and additives, precipitation of the barium with the sulfate ion can cause scale and corrosion problems that are difficult to control. These deposits, which form mainly on screens, fan pumps, organ tubes, headbox and rectifier rolls, and the like, often cause formation problems and paper machine breaks. They also provide sites for anaerobic sulfate-reducing bacteria to develop, resulting in chemical and biological corrosion.

One of the ways scale build-up can be prevented is by reducing the concentration of ions in the water through ion exchange. In many cases, this is not economical and in others, such as downhole systems, it is impractical. Because of the costs and difficulty of treating the water systems externally, the addition of scale inhibitors has become increasingly popular. It is generally believed that scale inhibitors function by one or more of the following mechanisms: by dispersing the scale-forming ions, by enhancing the solubility of the scale-forming salts, and/or by modifying the crystal structure of the salts formed. Dispersants are thought to function by surrounding particulate materials with a barrier preventing random contact with other particles by either ionic repulsion or steric hindrance; they thus keep the salts in a loose flowable form. Solubility enhancers such as chelants and threshold inhibitors, i.e., substances which are able to control the solubility of large numbers of ions at low concentrations, increase the salt's solubility, thereby raising the temperature or concentration at which precipitation occurs. Crystal modifiers, such as organic polymers or foreign substances, affect the growth of the crystal or change the shape of the crystal by altering the axes and/or angles of the crystal.

In the petroleum industry, calcium sulfate and barium sulfate scaling is still a problem. Because of the inert character of these scales they are difficult to remove by chemical means. U.S. Pat. Nos. 3,806,451 and 3,962,110 (issued Apr. 23, 1974 and June 8, 1976 to Jack F. Tate) discuss the problem of removal including the use of strong alkali solutions. Treatment of calcium sulfate scale for 24–72 hours with concentrated potassium hydroxide and removal of the fluffy precipitate of calcium hydroxide thus formed is obviously undesirable or impossible. Moreover, alkali is not effective in preventing the build-up of scale deposits in the well tubing and production equipment.

The prior art discloses numerous processes for controlling the formation and/or deposition of scale using polymers. Of these, many disclose the use of acrylic and methacrylic acid polymers alone or in combination with other scale and/or corrosion control agents.

The following patents disclose the use of copolymers of acrylic or methacrylic acid with sodium vinyl sulfonate for scale control. They are directed to typical scales such as calcium sulfate, calcium carbonate, and/or calcium phosphate, magnesium silicate and iron oxide, as well as sludge and other foulants.

U.S. Pat. No. 3,682,224 (issued Aug. 8, 1972 to M. Bleyle) discloses the use of alkali metal or basic nitrogenous compounds of methacrylic acid-vinyl sulfonate copolymers (50–50 to 25–75%) for preventing the formation of carbonate and magnesium scale deposits in saline water evaporators.

U.S. Pat. No. 3,879,288 (issued Apr. 22, 1975 to F. H. Siegele) discloses the use of an aliphatic water-soluble copolymer of a monovinyl compound [e.g., (meth)acrylic acid, (meth)acrylamide, methacrylate, (meth)acrylonitrile, propylene, isobutene, 2-carbomethoxy propenoic acid, furmaric acid, and maleic acid] and about 25–75% mole % of a vinyl sulfonate including the acids, alkali salts, and allyl sulfonic acid for the control of hard, adherent scales, such as calcium and other alkaline earth metal salts, particularly carbonates and sulfates and/or iron. The copolymer should have a molecular weight of about 1000–25,000.

U.S. Pat. No. 4,361,492 (issued Nov. 30, 1982 to L. Dubin) discloses the use of acrylic acid-vinyl sulfonate copolymers as dispersants for particulate feric oxide. The copolymers generally contain 5–25 mole % of the vinyl sulfonate or its alkali metal salts (preferably sodium) and 95–75 mole % acrylic acid or its water-soluble alkali metal or ammonium salts. The molecular weights range from 500 to 50,000, preferably 1000–6000.

G.B. 2,110,659A (published June 22, 1983 by W. F. Lorenc et al.) discloses that the preferred water-soluble dispersing polymer is a vinyl sulfonate copolymer synthesized from 5–25 mole %, preferably 10–20%, vinyl sulfonate or its alkali metal (preferably Na) salts and from 95–75 mole %, preferably 90–80%, of acrylic acid and its water-soluble alkali metal or ammonium salts. The molecular weights range from 500–50,000, preferably 900–15,000 and most preferably 1000–6000. The copolymers are useful for calcium and magnesium scale forming salts.

Can. 1,148,438 (issued June 21, 1983 to M. Slovinsky et al.) discloses the use of specific copolymers of acrylic acid and/or its alkali metal or ammonium salts with an alkali metal vinyl sulfonate for reducing the scale on heat transfer surfaces. The copolymer has a mole ratio of acrylic acid to sodium vinyl sulfonate of from 90:10 to 60:40 and a molecular weight of 1,000–60,000.

Only five patents, U.S. Pat. No. 3,806,451 and 3,962,110 to A. Tate (cited previously), U.S. Pat. No. 4,008,164 (issued Feb. 15, 1977 to J. D. Watson), U.S. Pat. No. 4,530,766 (issued July 23, 1985 to W. M. Hann et al.), and U.S. Pat. No. 4,590,996 (issued May 27, 1986 to D. H. Hoskin et al.) even discuss the control of barium sulfate scale. Of these the Tate patents and Watson patent never exemplify its control, exemplifying only the control of calcium sulfate scale. The Tate processes incorporate in the aqueous system a tetrapropyl-tetraphosphoric acid and/or the alkali metal salts thereof (U.S. Pat. No. 3,806,451) or a water-soluble polyvinylpyrrolidinone with the system being made by the addition of up to 30 wt. % of a non-oxidizing mineral (U.S. Pat. No. 3,962,110). The Watson process involves the addition of a copolymer of acrylic acid and methyl acrylate (4–5:1 moles) having a molecular weight of 6000–8000. The Hann patent involves the addition of an acrylic acid - methacrylic acid copolymer (30–70% by weight of methacrylic acid) having a molecular weight of about 2000–5000. Scale control is exemplified in a mixed system where the barium ion is a minor component (136 out of a total of 20,279 mg./l). The Hoskin patent involves the addition of a polyalkoxy sulfonate. Scale control is exemplified in salt solutions (0.5M and 1.0M NaCl) containing barium sulfate ($1 \times 10^{-3}$M and $0.5 \times 10^{-3}$M). In most cases, precipitation was only delayed from several hours to 24 hours. With several inhibitors there was no precipitation after several days. As noted below, barium sulfate is considerably more soluble in the presence of salt and it is not clear how effective this treatment would be in the absence of salt.

As pointed out by Hoskin, barium and strontium sulfate scales are of particular concern because of their extremely low solubilities ($10^{-4}$ to $10^{-5}$ [$Ba^{++}$] depending upon brine concentrations and temperature). At room temperature the solubility of $BaSO_4$ in distilled water is about 2 ppm and at 80° C. it is only about 4 ppm. In 0.5M NaCl, the solubility is 7 ppm at room temperature and about 30 ppm at 80° C.; in 1.0M NaCl, the solubility is about 23 and 42 ppm, respectively. Brackish waters and dilute brines can contain up to 36 ppm $Ba^{++}$, while other hard scale brines formed in mixing tanks and surface lines can contain from 75 to 180 ppm $Ba^{++}$. The extreme insolubility of barium sulfate makes it very likely that scaling will occur if both barium and sulfate ions are present in a system. There is, therefore, a need for a process for effectively inhibiting the formation of barium sulfate scale and other heavy metal scales associated therewith, as well as calcium sulfate, calcium phosphate, and calcium carbonate scale typically also present in downhole systems.

SUMMARY OF THE INVENTION

The present invention provides a process for effectively inhibiting and controlling the deposition of scale-imparting precipitates in aqueous mediums containing significant amounts (at least 50 ppm.) of barium sulfate and other heavy metal sulfates, such as lead sulfate and strontium sulfate, which typically occur therewith, as well as calcium carbonate, calcium sulfate, calcium phosphate and the like, under scale-forming conditions by adding an effective amount of an acrylic acid/sodium vinyl sulfonate copolymer having a weight ratio of 70–95% acrylic acid and 5–30% of a vinyl sulfonate, preferably sodium vinyl sulfonate, and a molecular weight $M_w$ of up to 90,000, preferably less than 75,000. The copolymers are effective as solubility enhancers and/or dispersants, with the specific effect depending upon the salt. They are also effective as crystal modifiers. It is believed that the modified salt crystals, which are reduced in crystal class, have internal stresses which cause them to fracture easily, thus reducing their tendency to adhere to surfaces with which they come in contact. Of the patents which disclose the use of (poly)acrylic acid/sodium vinyl sulfonate copolymers, none recognize their special utility for the control of barium sulfate scale and other heavy metal scales in aqueous mediums containing 100, preferably 250, most preferably 375 ppm barium sulfate.

The present invention also provides fibrous barium sulfate crystals which are prepared by altering the crystal structure of barium sulfate by adding a low molecular weight copolymer of 70–95% by weight of acrylic acid and 5–30% by weight of a vinyl sulfonate, preferably sodium vinyl sulfonate, or a low molecular weight homopolymer of acrylic acid to supersaturated aqueous solutions of the salt and then allowing the fibers to form. The molecular weight must be less than 93,000, preferably about 6200–6300. Barium sulfate is highly reflective and is used in the ceramic coatings on radar shells. It is believed that the fibrous crystals should be less brittle and their deposition on the surface should be better. It is also believed the fibers may be useful as a substitute for asbestos fibers.

BRIEF DESCRIPTION OF THE DRAWINGS

For a more complete understanding of the nature and scope of the alterations in the barium sulfate crystal structure, reference may be made to the accompanying drawings wherein.

Figure 1:
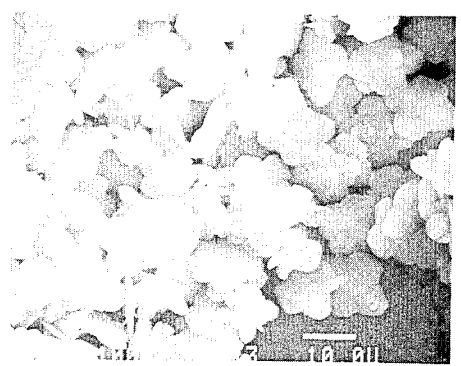
FIG. 1 (control) is a scanning electron photomicrograph of unmodified barium sulfate crystals. it shows that the crystals are ortho-rhombic and that they are twinned and aggregated into rosettes. Twinning is the growth of a crystal face from the center of an existing face.
Figure 2:
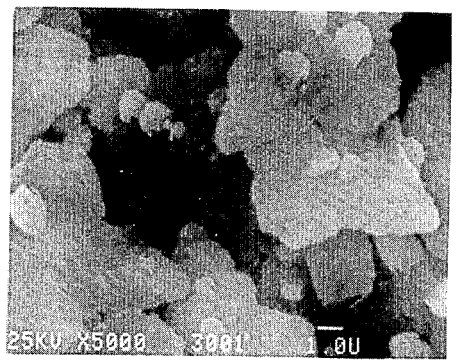
FIG. 2 (control) is a higher magnification photomicrograph of unmodified barium sulfate crystals of FIG. 1.
Figure 3:
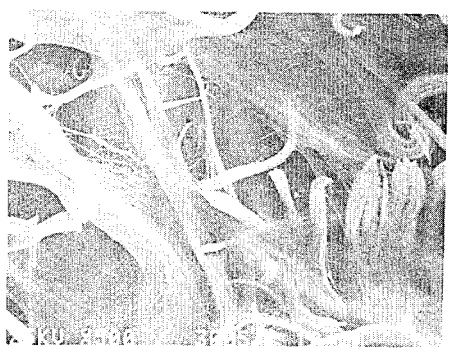
FIG. 3 is a photomicrograph of barium sulfate crystals modified with one of the acrylic acid:sodium vinyl sulfonate copolymers (95/5–6300 $M_w$) useful herein. It shows a dramatic alteration of the crystal growth and habit. Instead of ortho-rhombic crystals, long thin fibers with an average diameter of 0.05 micrometers and lengths up to 2 millimeters are formed.
Figure 4:
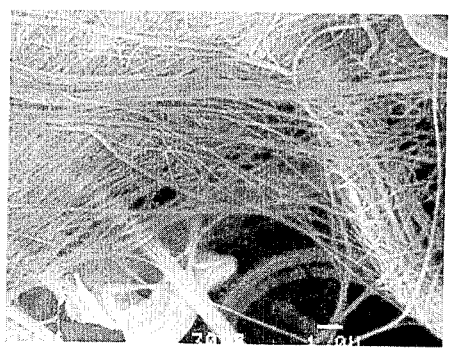
FIG. 4 is a higher magnification photomicrograph of the barium sulfate fibers of FIG. 3.
Figure 5:
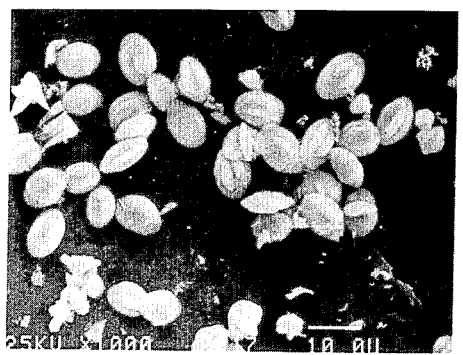
FIG. 5 (comparative) is a photomicrograph of barium sulfate crystals modified with a high molecular weight acrylic acid:sodium vinyl sulfonate copolymer (95/5-93,000$M_w$) not useful herein. It shows a slight rounding of the edges and reduction in the formation of rosettes. There is no fiber formation.
Figure 6:
FIG. 6 is a photomicrograph of barium sulfate modified with the low molecular weight sodium polyacrylate (Mw=6200) useful herein. It shows the same type of crystal modification shown in FIG. 3; however, the fiber length is somewhat shorter.
Figure 7:
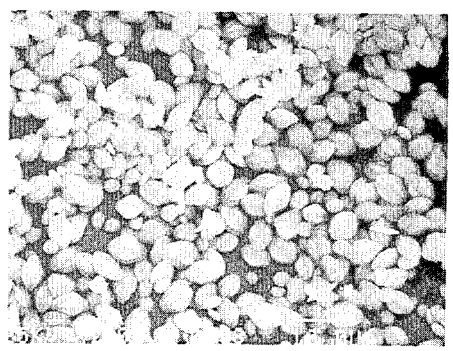
FIG. 7 (comparative) is a photomicrograph of barium sulfate crystals modified with sulfonated styrene:maleic anhydride copolymer. It shows a reduction in the orthorhombic crystal size. Twinning and rosette formation are also reduced. There is no fiber formation.
Figure 8:
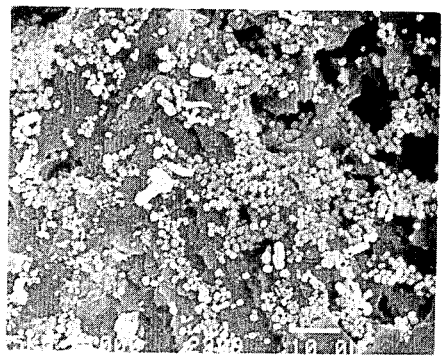
FIG. 8 (comparative) is a photomicrograph of barium sulfate crystals modified with sodium polyacrylate. It shows a dramatic reduction in the orthorhombic crystal size. Twinning and rosette formation are no longer seen. There is no fiber formation.
Figure 9:
FIG. 9 (comparative) is a photomicrograph of barium sulfate crystals modified with an acrylic acid:sulfoethyl methacrylate copolymer. It shows a reduction in the orthorhombic crystal size. Twinning and rosette formation are reduced. There is no fiber formation.

Magnification for FIGS. 1, 3 and 5-9 is 1000 times and for FIGS. 2 and 4 is 5000 times.

DESCRIPTION OF THE PREFERRED EMBODIMENTS

The copolymers and polymers useful herein may be readily prepared by a standard solution polymerization in the presence of free radicals using a combination of water and a volatile inert solvent. A typical polymerization process is described in U.S. Pat. No. 3, 203,938 issued Aug., 31, 1965 to R. L. Baechtold. Suitable monomers include acrylic acid, but not however methacrylic acid. The alkali metal vinyl sulfonates useful herein may be the sodium, potassium or lithium vinyl sulfonates. Sodium sulfonate is preferred because it is more readily available and thus more economical to use. The solvent employed is typically a saturated aliphatic alcohol containing from 1 to 4 carbon atoms, preferably ethanol. The polymerization may be carried out in the presence of any catalyst capable of liberating free radicals under the reaction conditions employed. Suitable catalysts include peroxides such as benzoyl peroxide, azo compounds such as azobis(isobutyronitrile), and salts of peracids such as potassium and ammonium persulfate. The polymerization will normally be carried out at a temperature of about 40°-80° C., preferably about 50°-70° C. The resulting polymers are water-soluble materials which are typically not isolated prior to their use for inhibiting scale formation. In the examples which follow, all parts and percentages are by weight and all temperature in degrees Celsius unless otherwise noted. The following test procedures were used.

Preparation of The Solutions Used For Crystal Modification

Saturated solutions of barium sulfate are formed by combiing barium chloride and sodium sulfate. The solutions are filtered to remove any crystals formed immediately. The crystal modifiers are added at the indicated ppm to one of the brines. The solutions are then allowed to evaporate under constant temperature and constant humidity conditions. Photomicrographs are taken at the first evidence of crystal formation or after one month of aging.

Brookfield Viscosity

RVF Brookfield viscosities were determined at 25° C. and 20 RPM.

Solubility Enhancement

The test is carried out using the precipitation test described in the National Association of Corrosion Engineer's (NACE) Standard TM-03-74. The polymer is added to a solution containing a salt of limited solubility formed by mixing two soluble salts, aging the solutions for a period of time, and titrating an aliquot of the supernatant solution with the disodium salt of ethylene diamine tetracetic acid (EDTA) to determine the salt remaining in solution.

EXAMPLE I

This example demonstrates the effectiveness of acrylic acid/sodium vinyl sulfonate copolymers (AA/SVS) as dispersants for barium sulfate slurries.

Preparation of The 95/5 Acrylic Acid/Sodium Vinyl Sulfonate Copolymer

A 1 liter round bottom flask equipped with a thermometer, agitator, condenser, nitrogen inlet tube, and slow addition funnels was charged with a solution of 10 g. water, 20.0 g. sodium vinyl sulfonate (as a 25% solution), 0.8 g. sodium persulfate, and 0.20 g. acrylic acid (Charge A). The contents were purged subsurface with nitrogen for 1 hour while heating to 95° C. The following charges were slowly and separately added over 4 hours: 94.8 g. acrylic acid and 60.0 g. isopropanol (99%) (Charge B) and 18 g. water and 3.0 g. sodium persulfate (Charge C). Reflux developed during the additions and was maintained for 1 hour thereafter. The flask was equipped with a Dean-Stark trap, stripping off of the alcohol was begun, and during the stripping 100.0 g. of 50% sodium hydroxide (Charge D) was slowly added over 2.5 hours. The solution was stripped to about 95° C. and 100 parts of alcohol were removed.

Using the above procedure, other copolymers having the indicated mole ratios and molecular weights were prepared.

Evaluation of The Copolymers As Dispersants for Barium Sulfate

The above polymer solutions (about 50% solids) were diluted to 10% solutions. Various amounts of each polymer were then added to a slurry containing 83% by weight of barium sulfate solids. The Brookfield viscosities of the resultant slurries were measured, with lower viscosities indicating better dispersibility. The results are summarized in Table I which also includes data on known polymeric dispersants, i.e., polyacrylate (A) and sodium polyacrylate (SA). The results include data on the viscosity after the samples were allowed to stand for a week and the redispersed.

The results show that the low molecular weight (8420 and 17,800) acrylic acid/sodium vinyl sulfonate copolymers were excellent dispersants at low usage levels and that their stability was good. They were better than the polyacrylate and low molecular weight sodium acrylate polymer at all usage levels.

EXAMPLE II

This example shows the use of lower dosage levels of the acrylic acid/sodium vinyl sulfonate copolymers as dispersants for barium sulfate slurries.

The slurries were prepared as in Example I except that a 90% slurry was used. The dosage levels (% by wt. on slurry solids) and viscosities are given in Table II.

TABLE I

| | Initial Viscosity (Redispersed Viscosity) in cps. Dosage Level - % by wt. based on slurry solids | | | | | | | | | |
|---|---|---|---|---|---|---|---|---|---|---|
| Dispersant | 0.1% | 0.2% | 0.3% | 0.4% | 0.5% | 0.6% | 0.7% | 0.8% | 0.9% | 1.0% |
| AA/SVS - 95/5 (8420 $M_w$; 3010 $M_n$; 2.8 $M_w/M_n$) | $200^a$ (275) | $300^a$ (200) | $425^a$ (325) | $925^a$ (450) | 1075 (550) | 1700 (700) | 2400 $(950^b)$ | 3075 $(1200^b)$ | 4225 $(1625^b)$ | 4725 $(2150^b)$ |
| AA/SVS - 95/5 (17,800 $M_w$; 5160 $M_n$; 2.8 $M_w/M_n$) | $200^a$ (broke) | $300^a$ (175) | $500^a$ (250) | 800 (400) | 1350 (600) | 2200 (750) | 2675 (925) | 2500 (1000) | 3700 (1550) | 4400 (1800) |
| AA/SVS - 95/5 (625,000 $M_w$; 5230 $M_n$; 120 $M_w/M_n$) | $650^a$ (1150) | $550^a$ (1350) | 750 (900) | 1850 (1350) | 3200 (1950) | 3750 (2475) | 4250 (2850) | + + | + (4450) | + + |
| SA (27,000 $M_w$) | $275^a$ (not re-dispersible) | $450^a$ (350) | 975 (700) | 1700 (950) | 2475 (1250) | 3700 (1900) | 3625 (1975) | + (2850) | 4375 (2950) | + (3150) |
| SA (230,000 $M_w$) | 4850 (+) | + (+) | + $(+^c)$ | + $(+^c)$ | + $(+^c)$ | + $(+^c)$ | + $(+^c)$ | + $(+^c)$ | + $(+^c)$ | + $(+^c)$ |
| A (4500 $M_w$) | 425 (650) | 750 (1000) | 900 (1600) | 1425 (1875) | 2050 $(2675^b)$ | 2325 $(2800^b)$ | 4175 $(3800^b)$ | — — | — — | — — |

$^a$Settled quickly
$^b$Easy to redisperse
$^c$Soft gel, easy to redisperse
+Too thick to disperse

TABLE II

| | Initial Viscosity (Redispersed Viscosity) in cps. Dosage Level - % by wt. based on slurry solids | | | | |
|---|---|---|---|---|---|
| Dispersant | 0.01% | 0.025% | 0.050% | 0.075% | 0.1% |
| AA/SVS - 95/5 (18,800 $M_w$; 5110 $M_n$; 3.67 $M_w/M_n$) | 1170 | 250 | 170 | 210 | 230 |
| AA/SVS - 95/5 (7130 $M_w$; 3050 $M_n$; 2.34 $M_w/M_n$) | * | 220 | 170 | 150 | 190 |
| AA/SVS - 95/5 (10,100 $M_w$; 3900 $M_n$; 2.60 $M_w/M_n$) | * | 220 | 170 | 170 | 200 |

*Off-scale

The results show that the copolymers were effective dispersants at dosage levels as low as 0.025%. After standing for several hours less settling occured in the lower dosage samples, i.,e., there was less supernatant water present.

EXAMPLE III

This example demonstrates the effectiveness of the copolymers herein as solubility enhancers for calcium carbonate and calcium sulfate.

Part A

The solubility enhancement was studied using acrylic acid/sodium vinyl sulfonate copolymers (AA/SVS) having different mole ratios. The results are given in Table III.

TABLE III

| Polymer (5 ppm) | | Salt in Solution (mg./l.) | |
|---|---|---|---|
| Type | Weight | $CaCO_3$ | $CaSO_4$ |
| None (blank) | — | 2870 | 3672 |
| AA/SVS | 95/5 (13,300 $M_w$; 3690 $M_n$; 3.61 $M_w/M_n$) | 4200 | 5168 |
| AA/SVS | 90/10 (20,400 $M_w$; 4740 $M_n$; 4.30 $M_w/M_n$) | 4180 | 5100 |
| AA/SVS | 80/20 (125,000 $M_w$; 5750 $M_n$; 21.8 $M_w/M_n$) | 4100 | 5100 |

The results show the ability of the copolymers to increase the solubility of calcium carbonate and calcium sulfate as indicated by the higher salt level in solution.

PART B

The solubility enhancement obtained using the acrylic acid/sodium vinyl sulfonate copolymer (95/5 weight percent) was compared with that of other known solubility enhancers, i.e., polyacrylic acid (AA) and sulfonated styrene/maleic anhydride copolymer (SS/MA), which is known to be especially useful for calcium sulfate scale, and sodium acrylate (SA) which is known to be especially useful for calcium carbonate scale. The results are shown in Table IV.

TABLE IV

| Polymer (5 ppm) | | Salt in Solution (mg./l.) | |
|---|---|---|---|
| Type | | $CaSO_4$ | $CaCO_3$ |
| None (blank) | | 2870 | 3672 |
| AA/SVS 95/5 | 13,300 $M_w$ | 4200 | 5168 |
| AA* | 5,000 $M_w$ | 4100 | 5032 |
| None (blank) | | 3910 | 2545 |
| AA/SVS 95/5 | 13,300 $M_w$ | 5134 | 3515 |
| SS/MA* 75/25 | 20,000 $M_w$ | 5066 | 2400 |
| SA* | 5,000 $M_w$ | 5200 | 3520 |

*Comparative

The results show that the acrylic acid/sodium sulfonate copolymer was comparable to the known solubility enhancers.

EXAMPLE IV

This example studies the effect of increasing dispersant concentration on the solubility of calcium sulfate.

The testing method of Example I was used. The results are given in Table V.

TABLE V

| AA/SVS Copolymer (95/5) (ppm) | | |
|---|---|---|
| (6539 $M_w$; 1966 $M_n$; 3.3 $M_w/M_n$) | 13,300 $M_w$; $M_n$; $M_n/M_n$ | $CaSO_4$ in Solution (ppm) |
| 0.00 (blank) | — | 3549.6 — |
| 0.10 | — | 4039.2 — |
| 0.25 | — | 4739.2 — |
| 5 | 5 | 4977   5168 |
| 10 | 10 | 5025   4964 |
| 30.00 | — | 4984.4 — |
| 50.00 | — | 4814.4 — |

The results show solubility enhancement at 0.10 ppm. At higher levels the enhancement reached a maximum which did not vary significantly even when the usage level was increased to 50 ppm.

EXAMPLE V

This example illustrates the effect of selected acrylic acid/sodium vinyl sulfonate copolymers on the crystal structure of barium sulfate and describes the fibers thus produced. It also shows the effect of other crystal modifiers, dispersants, and/or solubility enhancers on barium sulfate.

Saturated solutions of barium sulfate were prepared which contained the indicated amounts of acrylic acid/sodium vinyl sulfonate copolymers (AA/SVS), as well as representative polymers known as scale inhibitors, i.e. polyacrylic acid (AA), acrylic acid/hydroxypropyl acrylate copolymer (AA/HPA), sulfonated styrene/maleic anhydride copolymer (SS/MA), acrylic acid/sulfoethyl methacrylate copolymer (AA/SEMA) and, sodium polyacrylate (SA). Photomicrographs were taken of the crystals grown in the respective saturated solutions. The changes observed in crystalline structure are described in Table VI. Some of the photomicrographs are shown in FIGS. 1–9.

The results show that only the lower molecular weight AA/SVS copolymer (6300 mol. wt.) and acrylic acid polymer (6200 and 27,000 mol. wt.) modified the crystal structure in such a way that fibers formed and then only when used at above 20 ppm (i.e, at 40 and 60 ppm). The higher molecular weight AA/SVS copolymer (93,000), higher molecular weight polyacrylate (76,000), and other known crystal modifiers did not produce fibers.

EXAMPLE VI

This example illustrates the effect of the acrylic acid/sodium vinyl sulfonate copolymers on the crystal structure and solubility enhancement of other scale-forming salts. The effect of known crystal modifiers, dispersants, and solubility enhancers is also shown.

Saturated solutions of calcium sulfate, calcium phosphate, and calcium carbonate were prepared which contained the indicated amounts of acrylic acid/sodium vinyl sulfonate copolymers, as well as some of the comparative polymers of the previous example and a typical phosphonate (i.e., aminotri(methylene phosphonic acid). The changes observed in the crystalline structure are described in Table VII.

The results show that the acrylic acid/sodium vinyl sulfonate copolymer was more effective than the comparative copolymer in enhancing the solubility of calcium carbonate; no crystals formed with the AA/SVS copolymer, whereas modified crystals still formed with the comparative polymer. It was also as effective as was the comparative copolymer for modifying the crystal structure of calcium sulfate and calcium phosphate.

TABLE VI

| Salt | Polymer Type | Monomer Weight Ratio | Molecular Weight ($M_w$) | Amount (ppm) | Crystalline Structure |
|---|---|---|---|---|---|
| $BaSO_4$ | None | None | — | — | Orthorhombic crystals which are twinned and aggregated into rosettes (See FIGS. 1 and 2) |
| $BaSO_4$ | AA/SVS | 95/5 | 6,300 | 20 | Small, irregularly shaped crystals |
| $BaSO_4$ | AA/SVS | 95/5 | 6,300 | 40 | Long fibers (See FIGS. 3 and 4) |
| $BaSO_4$ | AA/SVS | 95/5 | 6,300 | 60 | Long fibers, some up to 2 mm, with average diameter of 0.05 micrometers. Crystal aggregates have a spiralling nature. High resolution transmission electron microscopy shows fibers to be hollow, resembling chrysotile asbestos. |
| $BaSO_4$ | AA/SVS* | 95/5 | 93,000 | 40 | No fiber formation. Orthorhombic crystals which are slightly rounded with reduced rosette formation. (See the description of FIG. 5) |
| $BaSO_4$ | SA | — | 6,200 | 40 | Fibers (See FIG. 6) |
| $BaSO_4$ | Phosphonate* | — | — | 40 | Ovoid (football-shaped crystals) |
| | | | | 80 | Ovoid (football-shaped crystals) |
| $BaSO_4$ | AA/HPA* | 62.5/37.5 | 9,000 | 20 | Orthorhombic crystals with a reduction in twinning. |
| $BASO_4$ | AA/HPA* | 62.5/37.5 | 9,000 | 40 | Loss of twinning; spherical structure |
| $BaSO_4$ | AA/HPA* | 62.5/37.5 | 9,000 | 60 | Loss of twinning, spherical structure |
| $BaSO_4$ | SS/MA* | 75:25 | 7,000 | 20 | Smaller, more spherical rosettes |
| $BaSO_4$ | SS/MA* | 75:25 | 7,000 | 40 | Rosettes with less twinning apparent (See FIG. 7) |
| $BaSO_4$ | SA* | — | 2,000 | 20 | Plate-like aggregates, irregularly shaped |
| $BaSO_4$ | SA* | — | 2,000 | 40 | Smooth spherical crystals (see FIG. 8) |
| $BaSO_4$ | AA/SEMA* | 90:10 | 5,800 | 20 | Smooth pellet-shaped crystals |
| $BaSO_4$ | AA/SEMA* | 90:10 | 5,800 | 40 | Very irregular, aggregated clumps |

TABLE VI-continued

| Salt | Polymer Type | Monomer Weight Ratio | Molecular Weight ($M_w$) | Amount (ppm) | Crystalline Structure |
|---|---|---|---|---|---|
| | | | | | (see FIG. 9) |

*Comparative

TABLE VII

| Salt | Polymer Type | Monomer Weight Ratio | Molecular Weight ($M_w$) | Amount (ppm) | Crystalline Structure |
|---|---|---|---|---|---|
| CASO$_4$ | None | — | — | — | Long, acicular crystals with extensive twinning |
| CaSO$_4$ | AA/SVS | 95/5 | 6,300 | 60 | Assymmetrical crystals in spherical aggregates |
| CaSO$_4$ | AA/HPA* | 62.5/37.5 | 5,000 | 60 | Assymetrical crystals in spherical aggrates |
| Ca$_3$(PO$_4$)$_2$ | None | — | — | — | Monoclinic crystals as tubular, twinned crystals with a rhomobohedral outline |
| Ca$_3$(PO$_4$)$_2$ | AA/SVS | 95/5 | 6,300 | 60 | Aggregated spherical crystals composed of microcrystals |
| Ca$_3$(PO$_4$)$_2$ | AA/HPA* | 62.5/37.5 | 10,000 | 60 | Aggregated spherical crystals composed of microcrystals |
| CaCO$_3$ | None | — | — | — | Rhombohedral crystals |
| CaCO$_3$ | AA/SVS | 95/5 | 5,000 | 60 | Unchanged since the solubility-enhancing properties of the polymer did not allow crystals to form |
| CaCO$_3$ | SS/MA* | 75/25 | 7,000 | 60 | Rounded spherical crystals |

*Comparative

EXAMPLE VII

This example further demonstrates that the barium sulfate crystal modification is unique to the acrylic acid/sodium vinyl sulfonate copolymers.

Two acrylic acid/sodium vinyl sulfonate copolymers having a 95/5 molar ratio were compared with a methacrylic acid/sodium vinyl sulfonate copolymer having a 95/5 molar ratio. They were used to treat aqueous systems containing 250 and 375 ppm barium sulfate. The treatment levels were 40 to 80 ppm. The results are shown in Table VIII.

TABLE VIII

| Type | Polymer Viscosity at 25% (cps.) | Amount (ppm) | Barium Sulfate 250 ppm | Barium Sulfate 375 ppm |
|---|---|---|---|---|
| 95/5 AA/SVS (8160 mol. wt.) | 43 | 40 | slight fiber formation | slight fiber formation |
| 95/5 AA/SVS (8160 mol. wt.) | 43 | 80 | fiber formation | fiber formation |
| 95/5 AA/SVS (93,000 mol. wt.) | 57.5 | 40 | no fiber formation* | fiber formation |
| 95/5 AA/SVS (93,000 mol. wt.) | 57.5 | 80 | fiber formation | no fiber formation* |
| 95/5 MAA/SVS (13,800 mol. wt.) (comparative) | 90 | 40 | no effect | no effect |
| 95/5 MAA/SVS (13,800 mol. wt.) (comparative) | 90 | 80 | no fiber formation | no effect |

*Rounding and reduction in crystal size.

The results show that the methacrylic acid/sodium vinyl sulfonate copolymer (MAA/SVS) with the same mole ratio and a molecular weight of 13,800–14,600 produced no fibers, whereas the acrylic acid/sodium vinyl sulfonate copolymer (AA/SVS) produced fibers when used in an effective amount, with amount required depending upon the ppm of barium sulfate present.

Now that the preferred embodiments of the present invention have been described in detail, various modifications and improvements thereto will becomes readily apparent to those skilled in the art. Accordingly, the spirit and scope of the invention are to be limited only by the appended claims and foregoing specification.

What is claimed is:

1. A method of inhibiting the deposition of barium sulfate scale in a downhole aqueous system containing at least 50 ppm of barium sulfate, which consists of adding an effective scale-inhibiting amount of a water-soluble copolymer having a weight ratio of 70–95% acrylic acid and 5–30% of an alkali metal vinyl sulfonate, the copolymer having a weight average molecular weight of below about 90,000, wherein the solubility and/or the dispersibility of the barium sulfate is enhanced and the crystal structure of the barium sulfate is modified to produce fibers.

2. The method of claim 1, wherein the alkali metal vinyl sulfonate is sodium vinyl sulfonate.

3. The method of claim 2, wherein the polymer is the acrylic acid copolymer with about 5% sodium vinyl sulfonate and wherein the polymer has a molecular weight of about 6200–6300.

4. The method of claim 1, wherein the scale-forming aqueous system also contains calcium sulfate and calcium carbonate.

* * * * *